United States Patent [19]
Moser et al.

[11] Patent Number: 5,770,164
[45] Date of Patent: Jun. 23, 1998

[54] CLEAR LIQUOR ORGANIC ACID FLUE GAS DESULFURIZATION SYSTEM

[75] Inventors: Robert E. Moser, Palo Alto; David R. Owens, Mountain View, both of Calif.; James H. Wilhelm, Sandy, Utah; James D. Colley, Anchorage, Ky.; Oliver W. Hargrove, Jr., Austin, Tex.

[73] Assignee: Electric Power Research Institute, Palo Alto, Calif.

[21] Appl. No.: 647,053

[22] Filed: May 9, 1996

Related U.S. Application Data

[60] Division of Ser. No. 453,897, May 30, 1995, Pat. No. 5,558,848, which is a continuation-in-part of Ser. No. 109,487, Aug. 20, 1993, abandoned.

[51] Int. Cl.$^6$ .............................. B01D 50/00; B01J 8/04; C10B 17/20
[52] U.S. Cl. ......................... 422/171; 422/172; 422/177; 261/115; 55/223; 55/228; 55/338
[58] Field of Search ........................ 423/243.01, 243.05, 423/243.08; 422/171, 172, 177, 262; 55/223, 228, 229, 338; 261/115

[56] References Cited

U.S. PATENT DOCUMENTS

| | | |
|---|---|---|
| 3,632,306 | 1/1972 | Villiers-Fisher et al. . |
| 3,873,275 | 3/1975 | Bennett . |
| 3,919,393 | 11/1975 | Selmeczi . |
| 3,919,394 | 11/1975 | Selmeczi . |
| 4,080,428 | 3/1978 | Hölter et al. . |
| 4,102,657 | 7/1978 | Mehta ....................................... 55/243 |
| 4,222,993 | 9/1980 | Hölter et al. ............................. 423/243 |
| 4,255,388 | 3/1981 | Miller ....................................... 422/168 |
| 4,294,807 | 10/1981 | Randolph . |
| 4,411,875 | 10/1983 | Butler et al. ............................. 423/242 |
| 4,431,618 | 2/1984 | Boward, Jr. et al. .................... 423/242 |
| 4,540,556 | 9/1985 | Wilhelm .................................. 423/242 |
| 4,670,234 | 6/1987 | Holter et al. . |
| 4,869,846 | 9/1989 | Mouche et al. . |
| 4,976,937 | 12/1990 | Lee et al. ................................. 423/242 |
| 5,039,499 | 8/1991 | Stowe, Jr. ............................... 423/242 |
| 5,213,782 | 5/1993 | Moser et al. ......................... 423/243.1 |
| 5,266,285 | 11/1993 | Glancy et al. ..................... 423/234.09 |
| 5,466,270 | 11/1995 | Abdelmalek .............................. 55/238 |
| 5,486,342 | 1/1996 | Moser et al. ....................... 423/243.01 |
| 5,595,713 | 1/1997 | Gohara et al. .......................... 422/170 |

FOREIGN PATENT DOCUMENTS

| | | |
|---|---|---|
| 2814644 | 10/1978 | Germany . |
| 2800994 | 7/1979 | Germany . |
| 288100 | 3/1991 | Germany . |
| 4300627 | 10/1992 | Japan . |

OTHER PUBLICATIONS

*Gas Purification*, Kohl, Arthur L. et al.; Gulf Pub. Co., 3d ed., 1979, p. 288.

*Primary Examiner*—Nina Bhat
*Attorney, Agent, or Firm*—Sixbey, Friedman, Leedom & Ferguson, P.C.; Donald R. Studebaker; Joan K. Lawrence

[57] ABSTRACT

An efficient and cost-effective flue gas desulfurization apparatus for removing sulfur dioxide from waste gases is provided. The apparatus employs a substantially solids-free clear liquor scrubbing liquid and an, organic acid additive capable of maintaining a process pH of 4.5 to 6.0 under inhibited oxidation conditions in the absorber to accomplish sulfur dioxide removal while avoiding scale formation and encrustation. Calcium sulfite relative saturation is controlled to a desired low optimum level by maintaining the circulating calcium ion concentration at a corresponding, optimum low level. A smaller thickener unit area is required to produced calcium sulfite crystals with optimum settling and dewatering characteristics. A reactor system that promotes the formation of small, efficiently dewatered calcium sulfite solids is also provided.

16 Claims, 2 Drawing Sheets

CLEAR LIQUOR ORGANIC ACID FLUE GAS DESULFURIZATION SYSTEM

This is a Divisional application of Ser. No. 08/453,897, filed May 30, 1995, now U.S. Pat No. 5,558,848 which is a continuation-in-part application of 08/109,487, filed Aug. 20, 1993, now abandoned.

TECHNICAL FIELD

The present invention relates generally to flue gas desulfurization systems and specifically to an improved flue gas desulfurization system conducted under inhibited oxidation conditions which employs clear scrubbing liquor, organic acids and an improved reactor design to enhance sulfur dioxide removal.

BACKGROUND OF THE INVENTION

The desulfurization of flue gas, particularly flue gas from power plants and industrial processes, has been the subject of considerable study. Air quality laws, both at the federal and state level, have set increasingly stringent emissions standards, especially for such well known pollutants as sulfur oxides. Because coal and oil-fired electric power generating plants can discharge large quantities of sulfur oxides as combustion by-products, much effort has focused on the desulfurization of these flue gases to reduce power plant sulfur dioxide emissions to permissible levels.

Substantial effort has been expended to develop a flue gas desulfurization process which removes substantially all of the sulfur dioxide from the flue gas. Although existing desulfurization process chemistries have achieved high sulfur dioxide removal, these processes have also created other environmental problems, most notably the disposal of the large quantities of solids produced by the most widely used flue gas desulfurization processes. However, available flue gas desulfurization processes also do not operate as reliably or efficiently or cost effectively as might be desired to remove sulfur oxides because the chemistry on which these processes are based requires the addition of expensive chemicals and produces scaling and equipment erosion, which contributes to high maintenance costs.

Most of the existing flue gas desulfurization (FGD) systems employ a suspended solids-containing slurry to contact the flue gas in a scrubber or absorber to remove sulfur dioxide from the flue gas. U.S. Pat. Nos. 3,632,306 and 4,294,807 exemplify sulfur dioxide removal processes wherein an aqueous slurry containing suspended solids is used to scrub sulfur dioxide from waste gas. Slurries such as these contain lime or limestone and the precipitates from reaction of the lime or limestone with sulfur dioxide, mainly calcium sulfite and/or calcium sulfate. The presence of the suspended solids in the scrubbing solution does not initially interfere with removal of the sulfur dioxide pollutants. However, these scrubbing solution solids block and plug FGD system components by solids deposition or scale formation and erode FGD system equipment. The use of a solids-containing slurry as a scrubbing medium may also produce abrasion on the pumps, piping nozzles and other system components, leading to costly equipment repairs and replacement. As a result, FGD systems using suspended solids-containing scrubbing solutions or slurries have not been as reliable as might be desired. Additionally, high liquid to gas ratios are required because such systems have little liquid phase buffering capacity. Moreover, packing cannot be added to the absorber without scaling or plugging of the packing. Consequently, these scrubber systems are relatively expensive to operate, in part because of frequent occurrences of abrasion and mist eliminator plugging, which results in high maintenance costs.

The prior art has proposed methods for removing sulfur dioxide from waste gases using clear wash liquid to eliminate the foregoing problems. The most widely used clear liquor scrubbing process is the dual alkali process, which uses a sodium sulfite clear liquor scrubbing solution. The solution is recirculated in the absorber, and a bleed stream is split off for regeneration in an external reactor. Lime or limestone is mixed with this bleed stream to precipitate the absorbed sulfur dioxide, the salts are separated from the liquor, and the clarified liquor is returned to the absorber for removal of more sulfur dioxide. Although these dual alkali systems have a history of lower capital and maintenance costs for the scrubber system and do not tend to exhibit scaling problems, the high sodium sulfite concentrations required to provide the liquid phase alkalinity results in high operating costs. The high concentration of sulfite and bisulfite in the typical dual alkali sodium buffering system means that only a small change in calcium sulfite relative saturation occurs across the scrubber as sulfur dioxide is removed from flue gas. Sodium is lost from the system in the dewatered filter cake and must be made up with soda ash, which is relatively expensive. Moreover, these absorber systems are designed to require a high concentration of buffer. The high buffer concentration causes high sodium make-up requirements, and the high sulfite concentration makes it impossible to operate at scrubbing pHs below about 5.8 because the high sulfite concentration in the buffer causes a high sulfur dioxide vapor pressure which reduces the scrubbing efficiency. In addition, dual alkali technology directs only a relatively low volume scrubber bleed stream to the reactor and clarifier. This requires high setting rates to reduce the size and cost of the clarifier.

U.S. Pat. Nos. 4,080,428 and 4,222,993 describe other methods for removing noxious contaminants, including sulfur dioxide, from waste gases wherein the contaminated gas is scrubbed or washed with solids-free or clarified liquid. In the process disclosed in U.S. Pat. No. 4,080,428, solids are removed from the wash liquid before it contacts the waste gas, and the pH of the wash liquid is carefully controlled to enhance oxidation and favor the formation of calcium sulfate. Acids, including carboxylic acids, are added to the wash liquid to control the pH and favor the formation of calcium bisulfite, which is readily oxidized to calcium sulfate. The method described in this patent requires a large quantity of wash water to achieve the desired results and, consequently, requires the consumption of a significant amount of energy.

The sulfur dioxide removal method of U.S. Pat. No. 4,222,993 requires a smaller volume of wash liquid than that required by U.S. Pat. No. 4,080,428. U.S. Pat. No. 4,222,993 discloses that this result can be achieved by the addition to the wash liquid of both an inorganic acid and an organic acid. A polybasic or multibasic carboxylic acid is disclosed to be most effective in reducing the volume of wash liquid required for effective scrubbing. The process of this patent is also conducted under conditions that promote the oxidation of calcium and sulfur-containing compounds to calcium sulfate. Although this is an effective desulfurization process, the calcium sulfate dihydrate or gypsum product formed tends to be deposited as chemical scale on the internal structures of the absorber and the piping so that the efficiency of the process decreases and the maintenance costs increase. Encrustation is a significant problem with this process because of the absence of suspended solids and, hence, seed crystals in the recirculated liquor. In addition, the high calcium ion concentration taught by this patent to enhance sulfur dioxide removal does not avoid but promotes encrustation and scaling.

Flue gas desulfurization processes conducted under inhibited oxidation conditions such as the flue gas desulfurization process disclosed in U.S. Pat. No. 5,266,285 have little difficulty with scaling because a slurry scrubbing system is used. This type of system provides seed crystals, which reduces the relative saturation of calcium sulfite, the precipitated species of sulfur dioxide. Scaling is also avoided in this system by maintaining a sodium sulfite buffering system with high concentrations of sulfite and sulfate. The pick-up in sulfite across the scrubber as sulfur dioxide is removed from the flue gas results in a very small increase in the total sulfite concentration. Consequently, there is very little or no increase in calcium sulfite relative saturation and little or no tendency to form scale in the scrubber in this type of slurry system.

The prior art desulfurization processes employing essentially solids-free or clear scrubbing liquid may effectively remove sulfur dioxide from waste gases under enhanced oxidation conditions that promote the formation of calcium sulfate. However, these processes are not particularly cost-effective because of their scrubbing solution make-up, energy consumption and equipment replacement requirements. Moreover, there is a great tendency for the formation of scale or encrustation in the system structural components. The prior art, therefore, fails to disclose a flue gas desulfurization process conducted under inhibited oxidation conditions that uses a clear, substantially solids-free scrubbing liquid and an organic acid buffer in conjunction with a chemistry which operates at an optimum pH to promote the efficient absorption of sulfur dioxide from waste gases and substantially eliminates the likelihood of scale formation by controlling the relative saturation of calcium sulfite. The prior art further fails to disclose a small volume reactor for a flue gas desulfurization process which improves particle size distribution and dewatering characteristics.

Consequently, a need exists for an efficient and effective desulfurization process and reactor wherein sulfur dioxide is scrubbed from waste gas with a clear, substantially solids-free organic acid buffer-containing scrubbing liquid under inhibited oxidation conditions and an optimum pH which controls the calcium sulfite relative saturation to avoid scaling and encrustation to produce easily dewatered calcium sulfite solids.

SUMMARY OF THE INVENTION

It is a primary object of the present invention, therefore, to overcome the disadvantages of the prior art and to provide a flue gas desulfurization process and reactor that employ a clear, substantially solids-free organic acid-containing scrubbing liquid at an optimum pH and controlled calcium sulfite relative saturation to remove sulfur dioxide from flue gas under inhibited oxidation conditions favoring the production of easily dewatered calcium sulfite solids.

It is another object of the present invention to provide a small volume reactor for a clear liquor scrubbing flue gas desulfurization process with a short liquor residence time and a long solids residence time.

It is a further object of the present invention to provide a clear liquor scrubbing flue gas desulfurization process and reactor that require only a minimum quantity of liquid for recirculation through the absorber and a reduced liquid recirculation rate relative to known flue gas desulfurization processes.

It is yet another object of the present invention to provide a flue gas desulfurization process wherein the calcium sulfite relative saturation is controlled by maintaining calcium ion concentration at an optimal low level.

It is still another object of the present invention to provide a clear liquor flue gas desulfurization process which controls the calcium sulfite relative saturation to avoid the formation of scale and encrustation.

It is yet a further object of the present invention to provide a clear liquor scrubbing flue gas desulfurization process and reactor which produces substantially pure recoverable carbon dioxide.

It is still a further object of the present invention to provide a flue gas desulfurization process scrubber which is packed to improve efficiency at lower L/G (liquid/gas) ratios than are currently possible.

It is still a further object of the present invention to provide a flue gas desulfurization process which effectively removes acid gas pollutants from industrial processes which produce such acid gases.

In accordance with the foregoing objects a flue gas desulfurization process and reactor are provided for removing acid gas pollutants, particularly sulfur dioxide, from industrial waste gases such as those produced by the combustion of coal and fossil fuel in an electric utility boiler. The flue gas desulfurization process of the present invention, which is conducted under conditions that inhibit oxidation, employs a substantially solids-free, clear liquor scrubbing liquid for the removal of the sulfur dioxide or other acid gas pollutants and produces easily dewatered solids. A dilute solution of organic acid capable of providing buffering in the scrubber or absorber in the pH range of 4.5 to 6 is added to the scrubbing liquid. The organic acid buffer solution is regenerated and recirculated through the scrubber. Because oxidation is inhibited, the production of calcium sulfite solids is favored, and the potential for chemical scaling is significantly minimized by maintaining a desired optimum calcium sulfite relative saturation. The circulating calcium ion concentration is controlled and maintained at an optimum minimum level by the addition of suitable cations, such as sodium or magnesium to assist in the maintenance of the desired calcium sulfite relative saturation.

The present invention further provides a small volume reactor for a clear liquor flue gas desulfurization process which includes a bed of reacted solids to promote the formation of large particles of calcium sulfite that are easily dewatered. The reactor design permits a short liquor residence time and a long solids residence time to improve calcium sulfite waste solids particle size distribution and dewatering.

Other objects and advantages will be apparent from the following description, claims and drawings.

DESCRIPTION OF THE PREFERRED EMBODIMENTS

Most existing flue gas desulfurization (FGD) systems employ a suspended solids-containing scrubbing solution to contact the flue gas in the scrubber or absorber to remove sulfur dioxide so that the flue gas meets air quality requirements when it is discharged into the environment. Most of these systems use a dual alkali chemistry, a sodium sulfite buffer system, or limestone solids in the absorbing slurry. In both of these systems, there is little or no increase in calcium sulfite relative saturation, so there is little or no tendency to form scale in the scrubber.

Although it would be desirable to remove the suspended solids from the scrubbing slurry, doing so without making other process changes generally causes scale formation in the scrubbers. The present invention provides a flue gas desulfurization process which employs a clear scrubbing liquor and thus avoids the problems associated with suspended solids or slurry scrubbing solutions. This process is also conducted under conditions to prevent, and thus avoid, scale formation in the remaining FGD system components. The control of calcium sulfite relative saturation in the process of the present invention has been discovered to be the key to avoiding scale formation when an organic acid buffer system is used with a clear, substantially solids-free scrubbing liquid. Because recirculating solids are undesirable in this process, in addition to the use of a clear scrubbing liquor, the present invention includes a reactor system which permits the reaction of sulfur oxides-containing scrubber effluent with lime or limestone in a location separate from the scrubber and promotes the formation of byproduct crystals of a size that allows efficient dewatering.

Figure 1:
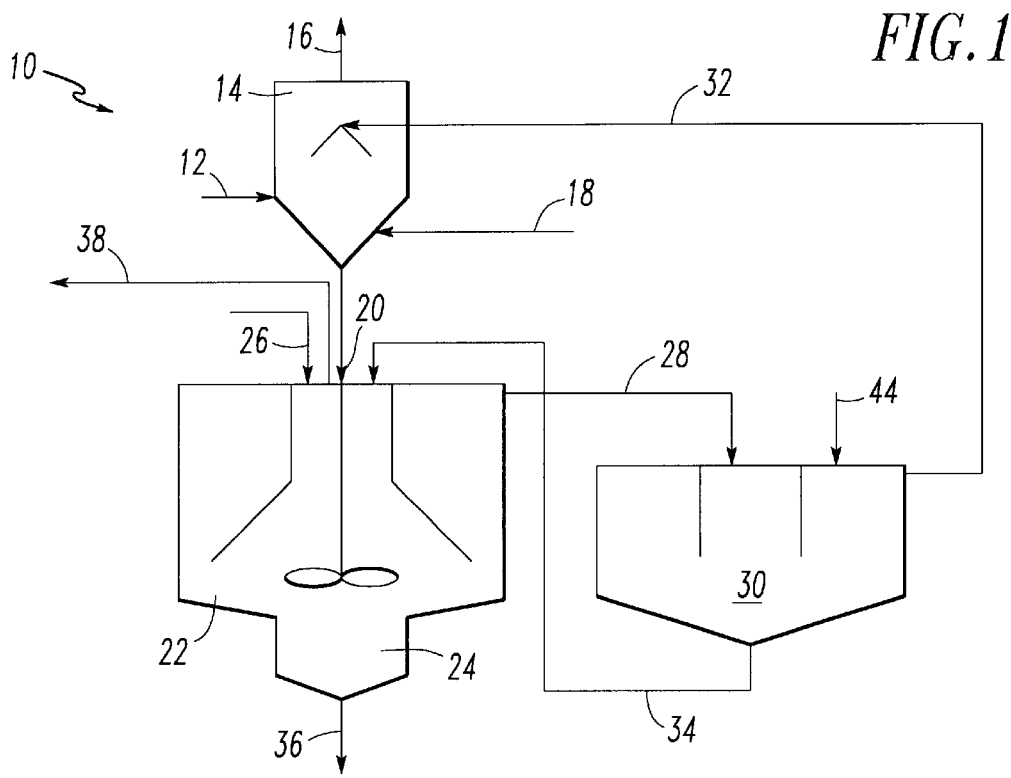
FIG. 1 is a schematic illustration of one embodiment of a suitable configuration of a flue gas desulfurization system and reactor with which the present process could be employed.

FIG. 1 is a schematic illustration of one embodiment of a, configuration of a flue gas desulfurization system 10 in which the present process can be employed. The present process has been shown to function effectively in this type of system. The positioning of the reactor system separate from the scrubber allows solids to be retained for a relatively long time, typically about 4 to 24 hours, while the circulating liquor, which is smaller in volume than in known FGD process reactors, has a short residence time, typically about 20 minutes to 2 hours. However, the present process could also be used with other configurations of flue gas desulfurization systems which employ an acid-buffered, clear, substantially solids-free scrubbing liquor and a reactor system of this type.

Flue gas containing sulfur oxides, typically from a power generating plant (not shown) enters the system at 12 and is directed to a scrubber or absorber 14 where the sulfur oxides are scrubbed from the gas. The sulfur oxides-free gas then exits the system at 16. Gas/liquid contact in the absorber is typically provided by a spray header (not shown). Organic acids are added to the scrubber liquid at 18 to provide the required pH buffering in the absorber. Sulfur oxides-containing scrubber effluent flows by gravity along the path indicated by arrow 20 to a reactor system 22 where the sulfur oxides-containing effluent is reacted with lime or limestone while oxidation is inhibited to produce calcium sulfite.

The reactor system 22, which includes a sludge bed type reactor, has a smaller volume than reactors currently used in FGD processes. This reactor design combines reactor and thickener functions so that the solids are thickened and clear overflow is produced in the same tank. Currently available FGD systems require both a separate reaction tank and a thickener. The present invention eliminates one of these two steps. Additionally, because the process of the present invention uses a clear, scrubbing liquor which has a very low concentration of suspended solids in the reactor, there would be few seed crystals to provide surface area for, precipitation of calcium salts if a conventional, stirred-tank limestone reactor were used. Consequently, the liquor may tend to become supersaturated with respect to calcium sulfite, which produces scale deposits in the reactor, piping and other FGD process equipment. This scaling tendency is reduced or eliminated in the present reactor system by providing a bed of reacted solids or sludge bed 24 in the reactor 22 shown in FIG. 1. Alternatively, solids must be recirculated to a conventional stirred-tank reactor to increase the suspended solids concentration in the reactor to a minimum range of 2 to 5 wt %.

Spent sulfur oxides-containing scrubbing liquor from the absorber or scrubber 14 is neutralized in the reactor system 22 with lime or limestone added at 26. In contrast to FGD systems in which only a relatively small bleed stream is split off for regeneration in an external reactor, substantially all of the scrubbing liquor is sent to the reactor system 22. Slurry from the reactor may be directed along a path 28 to an optional clarifier 30. In the event a clarifier is used, the clarified liquor is directed to the scrubber 14 along path 32 to achieve additional sulfur dioxide removal. Otherwise the reactor liquor, which is substantially solids-free, is sent directly to the scrubber. The underflow slurry 34 from the clarifier may be recirculated to the reactor system 22, where it is combined with the sludge in the sludge bed 24, and the thickened sludge 36 is dewatered. Alternatively, the clarifier underflow slurry 34 could be sent directly to a solids dewatering system (not shown).

All of the scrubbing liquor passes through the absorber only once before it is sent to the reactor system 22. This allows the use of very dilute concentrations of the organic acid buffers in the scrubber for effective buffering of the sulfur dioxide scrubbing process, which lowers the organic acid consumption rate.

The FGD system of the present invention produces recoverable pure carbon dioxide as a byproduct from the reactor system 22. Because the limestone is reacted in a vessel that does not mix the scrubbing liquor with the flue gas and the process is conducted under inhibited oxidation conditions, the carbon dioxide produced in the reactor system 22 is released from the top of the reactor at 38 as pure carbon dioxide mixed with water vapor. This carbon dioxide is easily collected, cooled to condense the water vapor, and compressed to sell as a byproduct 38 of the FGD process.

Large, round particles, referred to as small beads, of calcium sulfite can be produced in the reactor system 22 if the crystals are kept in the reactor for long residence times. If conditions favor the production of such particles, or at least an improved particle size distribution, the dewatering characteristics will be improved. Dewatering rates are much higher with the FGD system of the present invention than with typical slurry systems. Moreover, the dewatered filter cake typically will have 65% to 80% solids.

The large stirred tank reactors used in conventional FGD reactor systems require a high flow rate of liquor, which makes long residence times very costly. The present invention provides a unique reactor design that has a smaller volume than typical FGD process reactors. Solids are retained in the reactor for long residence times, while a short liquor residence time is maintained for process liquor. Liquor recirculation rates to the scrubber of less than 40 gallons per 1000 scf of flue gas can be maintained with this system.

Scrubbing efficiency can be improved even at lower liquid-to-gas, (L/G) ratios by packing the scrubber. Control of the calcium sulfite relative saturation and the use of clear liquor in the present FGD process reduce significantly or eliminate the potential for scaling and thus allow the use of packing in the scrubber to increase scrubbing efficiency.

It has been discovered that when an organic acid is added to the substantially solids-free scrubbing liquor in the scrubber, sufficient alkalinity is available to remove a maximum amount of sulfur dioxide from the flue gas, and the scrubbing liquor can be readily regenerated for re-use in scrubbing additional flue gas. It is preferred for this purpose to use an organic acid capable of providing buffering in the pH range of 4.5 to 6. The magnesium, calcium and sodium salts of the organic acid should be relatively highly soluble in the scrubbing liquor. Organic acids suitable for this purpose include a single organic acid, such as adipic, glutaric, succinic, formic, acetic, maleic and citric acids, the magnesium, calcium and sodium salts of these organic acids, and mixtures of the foregoing organic acids, such as DBA (dibasic acid), which is a mixture of adipic, succinic and glutaric acids. DBA, formic and adipic acids are preferred for the present process.

The organic acid buffers have distinct advantages over the sodium sulfite buffers presently used in FGD processes because they buffer at the required pH range of 4.5 to 6 without any tendency for off-gassing sulfur dioxide at the lower end of the pH range. High concentrations of sulfite buffers, in the range of 0.1 to 0.5 molar, can be used to lower the flow rate of liquor through the regeneration system. When limestone is used as the regenerating alkali, however, the pH in the scrubber is limited to 5.8 to 6.5 with sodium sulfite buffers. However, when sodium sulfite buffers are used, lower pH causes back pressure of sulfur dioxide from high sulfite concentrations, which reduces sulfur dioxide removal efficiency significantly. A higher pH is not reasonably achievable because of the suppression of limestone dissolution and reaction rates. These high sulfite, concentrations are avoided by the organic acids used with the process of the present invention.

Figure 2:
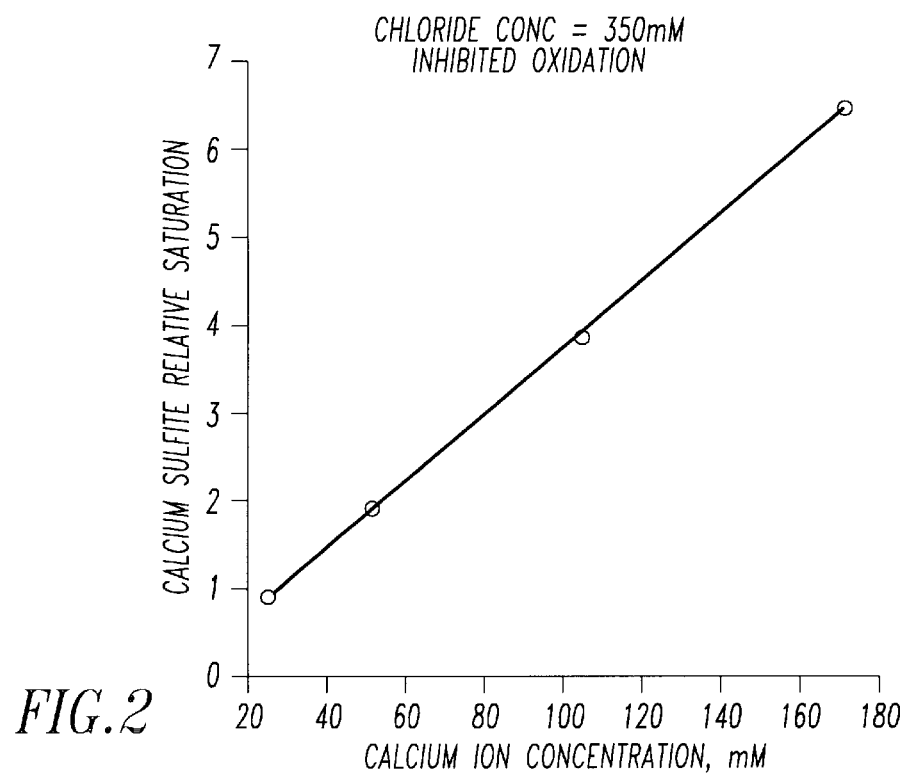
FIG. 2 illustrates, graphically, the relationship between calcium sulfite relative saturation and calcium ion concentration.

When an organic acid buffering system is used in a flue gas desulfurization process employing a clear scrubbing liquid, there is a great tendency for scale formation or encrustation unless the relative saturation for calcium salts is controlled. FIG. 2 is a graph which shows calcium sulfite relative saturation as a function of calcium ion concentration. It has been discovered that calcium sulfite tends to form scale on the scrubber internals if the calcium sulfite relative saturation is above about 5. This can be achieved by controlling the calcium ion concentration below about 120 millimoles in an inhibited oxidation system. However, since the calcium concentration will change with the chloride concentration, it is more important to control the calcium sulfite relative saturation to below about 5 and preferably within an optimum range of from 3 to 5 to avoid scaling and encrustation. FIG. 2 shows that there is a substantially linear relationship between calcium ion concentration and calcium sulfite relative saturation in a flue gas desulfurization process conducted under inhibited oxidation conditions.

Prior art processes have built up the calcium ion concentration through the use of soluble compounds such as organic acids or salts of acids. However, high calcium ion concentrations produce such negative effects in a flue gas desulfurization process as increasing the coprecipitation rate of some organic acids and reducing the reaction rate for limestone so that poor limestone utilization results. The present FGD process improves crystal growth and limestone utilization and reduces the consumption of organic acids by reducing the calcium ion concentrations to the levels which maintain the calcium sulfite relative saturation at less than 5 by adding soluble cations, such as sodium and magnesium, which suppress the calcium ion concentration. The combination of low calcium ion concentrations and low pH (4.5 to 6.0) favors high limestone reaction rates. Moreover, since the organic acid buffers preferred for use in the present FGD process work well at this low pH range, high sulfur dioxide scrubbing efficiencies can be achieved.

The organic acid-containing clear scrubbing liquor is circulated through the absorber 14, where it effectively removes sulfur dioxide, is next directed to the reactor 22 and is then recirculated to the absorber. The aqueous organic acid clear scrubbing liquor provides sufficient alkalinity for effective absorption of the $SO_2$ at ambient temperatures. In addition, relatively large quantities of $SO_2$ can be absorbed by this solution, which allows the quantity of liquid recirculated through the absorber to be kept to a minimum. As a result, the liquid recirculation rate through the scrubber is reduced, which requires less energy and thus lowers capital, operating and maintenance costs of the scrubber.

Because the present process is operated under conditions which inhibit oxidization, the absorbed $SO_2$ precipitates as calcium sulfite rather than calcium sulfate. This minimizes the likelihood of scale formation in the FGD system components. The present process preferably employs the addition of thiosulfate to inhibit the oxidation of absorbed sulfite to sulfate. Sulfur or thiosulfate may be added to the clarifier, if one is used, at 44. Calcium sulfate dihydrate or gypsum is well-known for producing chemical scale deposits on the internal structures of the absorber and in the FGD) system piping if oxidation is not inhibited. The amount of thiosulfate required to hold oxidation below 10%, preferably below 8%, is maintained in the FGD process liquor concurrently with the clear liquor organic acid scrubbing liquid. It is particularly preferred that the oxidation level be kept as low as practically possible to operate the FGD process so that it is scale free.

The consumption of organic acid by the present FGD process can be reduced if the process is controlled so that the calcium ion concentration is maintained at a level low enough to maintain the calcium sulfite relative saturation at less than 5. The addition of either sodium or magnesium to the system will accomplish this objective. Sodium is preferably added as the salt sodium formate. Although magnesium may occur naturally in the lime or limestone reagent used to regenerate the spent organic acid buffer and precipitate the dissolved $SO_2$, the addition of magnesium from an additional source may also be required. The dissolved calcium ion concentration should be controlled by the sodium or magnesium addition so that it is below about 20 to 120 millimoles per liter. Because the coprecipitation of organic acid with the calcium sulfite solids is directly proportional to the product of the activity of the calcium ion and the activity of the organic acid in solution, the minimization of the calcium ion concentration reduces the rate of consumption of organic acid. The annual cost of the organic acid additive is likely to be a major expense in the, operation of the flue gas desulfurization system described herein. Consequently, reducing the organic acid consumption rate by minimizing the calcium ion concentration will reduce the annual operating cost of the FGD system.

The flue gas desulfurization system of the present invention produces cost savings in other ways as well. The calcium, sodium and magnesium salts of the organic acids preferred for use in this FGD process are highly soluble so that when they are added to the scrubbing solution, and the scrubbing solution then contacts the flue gas, relatively large quantities of sulfur dioxide are absorbed. As a result, the quantity of liquid recirculating through the absorber can be kept to a minimum. Reducing the liquid recirculation rate produces a reduction in scrubber energy consumption, which lowers capital, operating and maintenance costs.

Figure 3:
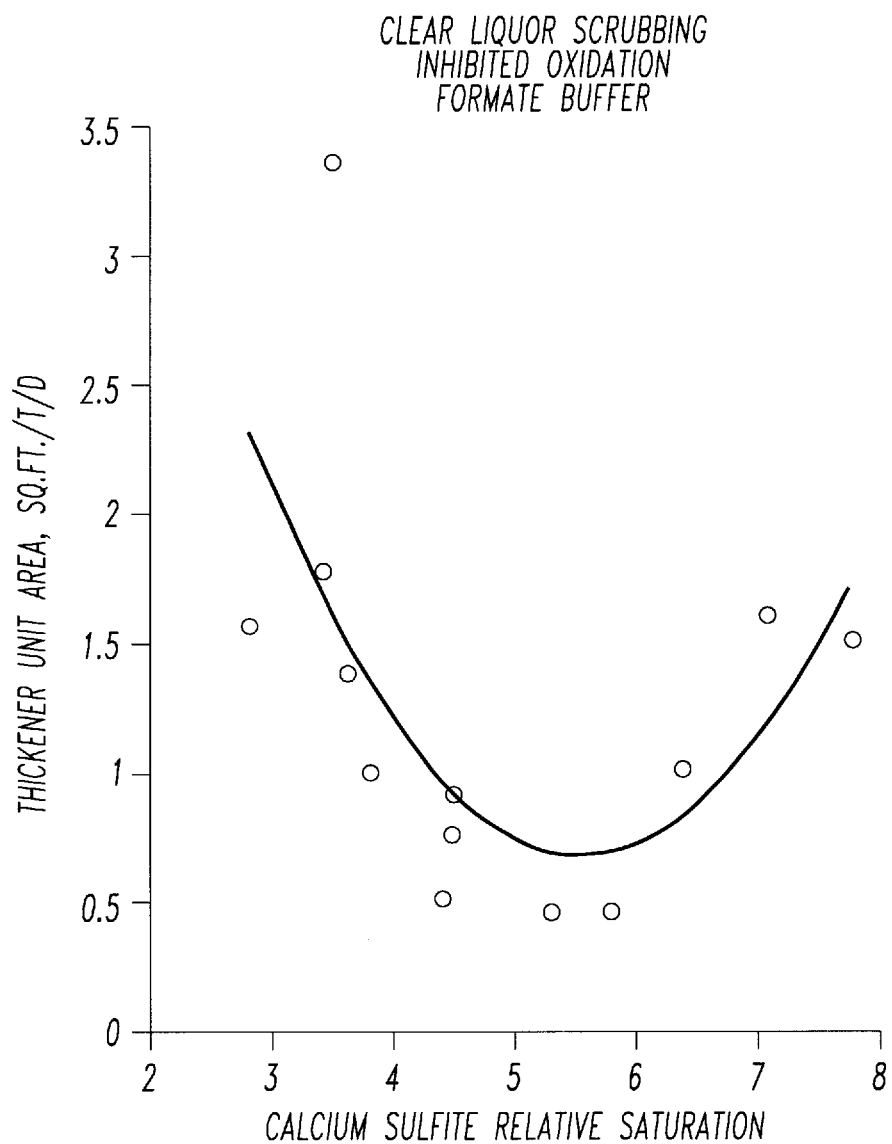
FIG. 3 illustrates, graphically, the effect of calcium sulfite saturation on thickener unit area.

It has also been discovered that the calcium sulfite relative saturation influences settling rates of the solids precipitated in the reactor system. When all of the scrubbing liquor passes through a clarification step, the solids settling rate is critical. High settling rates are required to reduce the size and cost of the clarifier. FIG. 3 illustrates, in graphic form, the effect of calcium sulfite relative saturation on thickener size (thickener unit area per ton of solids processed) for a clear liquor scrubbing flue gas desulfurization process conducted under inhibited oxidation conditions using a formate buffer system. When the calcium sulfite relative saturation is controlled around 5, a minimum thickener unit area of about 0.5 square feet per ton per day ($ft^2/t/d$) is achieved. This unit area is about 5% of the area required for typical dual alkali or lime and limestone scrubbing systems. The high settling rate possible when the calcium sulfite relative saturation is controlled to about 5 minimizes the cost of the process, in large part by producing solids with optimum dewatering properties.

Industrial Applicability

The flue gas desulfurization process of the present invention will find its primary applicability in the treatment of flue gases from electric power generating plants to efficiently and effectively remove sulfur dioxide from waste flue gases so that these waste gases meet flue gas emissions requirements where it is desired to avoid scale formation and optimize dewatering characteristics. The present clear liquor scrubbing flue gas desulfurization process can also be used to remove sulfur dioxide pollutants from the waste gases of other industrial processes.

We claim:

1. A wet flue gas desulfurization system for conducting a flue gas desulfurization process wherein sulfur dioxide is removed from sulfur dioxide-containing flue gas with a substantially solids-free clear scrubbing liquor and organic acid to produce gas that is substantially free of sulfur dioxide and sulfur oxide-containing waste solids, wherein said system comprises:

a) a scrubber fluidically connected to a source of sulfur dioxide-containing flue gas for scrubbing the sulfur dioxide from the flue gas with the organic acid-containing clear scrubbing liquor, wherein said scrubber includes a gas discharge line for discharging substantially sulfur dioxide-free gas into the environment and a gravity discharge line for directing substantially all of the sulfur dioxide-containing scrubber effluent from the scrubber;

b) a reactor system fluidically connected to the gravity discharge line to receive substantially all of the scrubber effluent, wherein said reactor system includes a single unitary reaction tank that combines reactor and thickener functions positioned proximate to the gravity discharge line and a sludge bed reactor formed integrally with the reaction tank and positioned distant from the gravity discharge line;

c) an acid addition line fluidically connected between a source of organic acid and the scrubber for adding an organic acid to the flue gas desulfurization system;

d) a reactor liquor discharge line fluidically connected between the reaction tank and the scrubber whereby substantially solids-free reactor liquor is directed from the reaction tank to the scrubber;

e) a conduit fluidically connected between a source of lime or limestone and the reactor system for directing lime or limestone into the reactor system; and f) a sludge discharge line fluidically connected to said sludge bed reactor to direct sulfur oxide-containing waste solids to a dewatering system for removing water from said waste solids.

2. The flue gas desulfurization system described in claim 1, further including a carbon dioxide release line fluidically connected to said reactor system at a location opposite said sludge bed reactor to release usable carbon dioxide from the reaction tank.

3. The wet flue gas desulfurization system described in claim 2, wherein the flue gas desulfurization process conducted by said system comprises:

a) maintaining a thiosulfate concentration at a level which inhibits oxidation to less than 10% in the system, maintaining a system pH of 4.5 to 6.0, and maintaining the calcium sulfite relative saturation in the system at less than 5;

b) scrubbing the sulfur dioxide-containing flue gas in aid scrubber with the substantially solids-free clear scrubbing liquor containing organic acid to remove the sulfur dioxide therefrom and to separate the flue gas into a substantially sulfur dioxide-free gas for discharge through said gas discharge line into the environment and a sulfur dioxide-containing scrubber effluent;

c) directing the sulfur dioxide-containing scrubber effluent the gravity discharge line into the reactor system and reacting the effluent with the lime or limestone in the reaction tank to form calcium sulfite solids which settle in the sludge bed (d) recirculating the substantially solids-free reactor liquor to the scrubber where it becomes part of the substantially solids-free organic acid-containing scrubbing liquor;

e) recovering substantially pure carbon dioxide from the carbon dioxide release line; and f) dewatering said calcium sulfite waste solids discharged from the sledge bed reactor.

4. The wet flue gas desulfurization system of claim 3, wherein oxidation is inhibited in the system to less than 8%.

5. The wet flue gas desulfurization system of claim 3, wherein said organic acid is selected from the group consisting of DBA adipic, glutaric succinic, formic, acetic, maleic and citric acids, salts thereof and mixtures thereof.

6. The wet flue gas desulfurization system of claim 3, wherein said substantially solids-free scrubbing liquid contains less than 1% suspended solids.

7. The wet flue gas desulfurization system of claim 3, wherein the calcium sulfite relative saturation is maintained in the system at less than 5 by controlling the dissolved calcium ion concentration to be less than 120 millimoles per liter.

8. The flue gas desulfurization system described in claim 1, wherein said reactor liquor discharge line is optionally fluidically connected to a clarifier positioned between the reactor system and the scrubber to receive reactor liquor from the reaction tank and to direct clarified liquor to the scrubber, wherein said clarifier includes an underflow slurry line fluidically connected to the reactor system to recirculate underflow slurry to the reaction tank.

9. The flue gas desulfurization system described in claim 8, wherein said underflow slurry line is fluidically connected directly to a solids dewatering system to remove water from said waste solids.

10. The flue gas desulfurization system described in claim 1, wherein said sludge bed reactor includes a bed of solids produced from the reaction of lime or limestone and sulfur dioxide-containing scrubber effluent in said reaction tank.

11. The flue gas desulfurization system described in claim 10 wherein the bed of solids comprises a bed of calcium sulfite solids.

12. The flue gas desulfurization system described in claim 1, wherein the scrubber is packed to improve scrubbing efficiency.

13. The flue gas desulfurization system described in claim 1 wherein the reactor system is sized to maintain a liquor recirculation rate in the flue gas desulfurization system of less than 40 gal/1000 scf flue gas.

14. The flue gas desulfurization system described in claim 1 wherein said system further comprises an oxidation inhibitor addition line fluidically connected between a source of an oxidation inhibitor selected from the group consisting of sulfur and thiosulfate and the reactor system for adding sulfur or thiosulfate to inhibit the oxidation of calcium sulfite to calcium sulfate in the reactor system.

15. A unitary reactor system for a clear liquor organic acid wet lime/limestone flue gas desulfurization system fluidically positioned in said flue gas desulfurization system at a location fluidically connected to but separate from a scrubber to receive sulfur oxide-containing effluent from the scrubber and reacting the sulfur oxide-containing effluent with lime or limestone to produce byproduct solids of a size that allows efficient dewatering and a clear liquor for circulation to the scrubber, wherein said reactor system comprises a single unitary reaction tank integrally formed with a sludge bed reactor that combines reactor, clarifier and thickener functions to receive in the reaction tank substantially all of the sulfur oxide-containing scrubber effluent and a supply of lime or limestone, thereby providing a single vessel wherein the scrubber effluent reacts with the lime or limestone to form calcium oxide/sulfur oxide solids that are thickened in the sludge bed reactor and discharged from the reactor system for dewatering and disposal and substantially solids-free clear liquor in the reaction tank for circulation from the reactor system to the scrubber.

16. The unitary reactor system described in claim 15 wherein said reactor system is sized to retain the calcium oxide/sulfur oxide solids in the sludge bed reactor for 4 to 24 hours before discharge and to retain the substantially solids-free clear liquor for 20 minutes to 2 hours in the reaction tank before circulation to the scrubber.

* * * * *